(12) United States Patent
Yoon et al.

(10) Patent No.: US 7,895,575 B2
(45) Date of Patent: Feb. 22, 2011

(54) APPARATUS AND METHOD FOR GENERATING TEST DRIVER

(75) Inventors: Seok Jin Yoon, Daejeon (KR); Gyu Sang Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1028 days.

(21) Appl. No.: 11/323,213

(22) Filed: Dec. 30, 2005

(65) Prior Publication Data

US 2007/0061641 A1   Mar. 15, 2007

(30) Foreign Application Priority Data

Aug. 19, 2005   (KR) .................. 10-2005-0076804
Dec. 2, 2005    (KR) .................. 10-2005-0116819

(51) Int. Cl.
*G06F 9/44* (2006.01)

(52) U.S. Cl. .................. 717/124; 717/126; 717/127; 717/131

(58) Field of Classification Search .................. 717/124, 717/126, 127, 131
See application file for complete search history.

(56) References Cited

U.S. PATENT DOCUMENTS

| 5,799,266 | A  |   | 8/1998  | Hayes |           |
|-----------|----|---|---------|-------|-----------|
| 6,023,580 | A  | * | 2/2000  | Sifter | .......................... 717/124 |
| 6,192,511 | B1 | * | 2/2001  | Johnston et al. ............. 717/109 |
| 6,212,675 | B1 | * | 4/2001  | Johnston et al. ............. 717/107 |
| 6,243,835 | B1 |   | 6/2001  | Enokido et al. |
| 6,353,897 | B1 | * | 3/2002  | Nock et al. .................. 714/38 |
| 6,370,682 | B1 | * | 4/2002  | Eckardt et al. .............. 717/106 |
| 6,505,342 | B1 | * | 1/2003  | Hartmann et al. ........... 717/107 |
| 6,976,246 | B1 |   | 12/2005 | Rosaria et al. |
| 7,334,219 | B2 | * | 2/2008  | Cebula et al. ............... 717/124 |
| 7,376,939 | B1 | * | 5/2008  | Nayak et al. ................ 717/114 |
| 2004/0237062 | A1 | * | 11/2004 | Zeidman et al. ............. 717/100 |
| 2005/0204334 | A1 | * | 9/2005  | Parthasarathy et al. ...... 717/107 |
| 2006/0010427 | A1 | * | 1/2006  | Hoffman ..................... 717/124 |

FOREIGN PATENT DOCUMENTS

KR   1020020095723   12/2002

(Continued)

OTHER PUBLICATIONS

Cody, W. J. "Algorithm 715: SPECFUN—A Portable FORTRAN Package of Special Function Routines and Test Drivers", 1993, ACM, p. 22-32.*

*Primary Examiner*—Wei Y Zhen
*Assistant Examiner*—Qamrun Nahar
(74) *Attorney, Agent, or Firm*—Ladas & Parry LLP (57) ABSTRACT

Provided are an apparatus and method for generating a test driver, capable of reducing errors caused in component development early on by enabling immediate checking as to whether architecture design requirements are satisfied during component development. Specific snapshot information is input to the interface for the individual component of the architecture model to extract a state variable storing the state information of the component. An interface that sets and checks the state variable is then added to enable unit testing for the component to proceed smoothly. Using an interface giving access to the state variable, a test preparation code setting a test environment and a test check code checking whether the state variable after interfacing reaches a proper state are generated, thereby automatically generating a test driver code.

11 Claims, 8 Drawing Sheets

| FOREIGN PATENT DOCUMENTS | | |
|---|---|---|
| KR | 1020040050463 | 6/2004 |
| KR | 1020040075464 | 8/2004 |
| KR | 1020040097941 | 11/2004 |
| KR | 1020050087129 | 8/2005 |
| KR | 1020060045072 | 5/2006 |
| KR | 1020060070609 | 6/2006 |
| KR | 1020070058943 | 6/2007 |

* cited by examiner

| Snapshot | State variable | State value | Input value | Expected value |
|---|---|---|---|---|
| 1 | (δ1,δ2,δ3,δ4...) | (δV1,δV2,δV3,δV4...) | F(p1,p2,p3...) | (δ1=ev1,δ2=ev2,δ3=ev3, δ4=ev4,...retval) |
| 2 | | | | |
| ... | | | | |

302

| Snapshot | State variable | State value | Input value | Expected value |
|---|---|---|---|---|
| 1 | (prioe,name) | (10,Test) | reservation(12) | (reserveid=4) |
| 2 | (prioe,name) | (14,Test) | reservation(11) | (reserveid=4) |
| ... | | | | |

```
import java.util.Array List;
import java.util. List;

public class Restaurant {                          401
        private int price;
        private String loc;
        private String seat;
        private String mero1;
                                                   402
        public String test_get_price( ) {
                return price;
        }
                                                   403
        public int test_set_price(int pprice) {
                price = pprice
        }
        . . .

public reservarion (int questid) {

```
package test;
import junit.framework.TestCase;
import gen.RestaurantHanager;
import gen.Restaurant;

public clas RestaurantTest entends TestCase {
        public static void main(String[] args) {
                    junit.swingui.TestRunner.run(Restaurant Test . class)
        }
        public void testRestaurant1( ) {
        // Test preparation code                                    601
                    Restaurant iRestautant = new Restaurant( );
                    iRestaurant. test _set_price(10);
                    iRestaurant. test _set_name("Test");
        // Test preparation code terminate
        // Test check code
                    iRestaurant. reservation(10);
                    assertBquals(2 , iRestaurant,test_get_reserveid( ));
        }
        public void testRestaurant2( ) {
        // Test preparation code
                    Restaurant iRestautant = new Restaurant( );
                    iRestaurant. test _set_price(20);
                    iRestaurant. test _set_name("Test);
        // Test preparation code terminate
        // Test check code
                    iRestaurant. reservation(10);
                    assertBquals(2 , iRestaurant,test_get_reserveid( ));
        }
}
```

…

APPARATUS AND METHOD FOR GENERATING TEST DRIVER

CROSS-REFERENCE TO RELATED APPLICATION

This application claims priority to and the benefit of Korean Patent Application Nos. 10-2005-0076084 filed on Aug. 19, 2005 and 10-2005-00116819 filed on Dec. 12, 2005, the disclosure of which are incorporated herein by reference in its entirety

BACKGROUND

1. Field of the Invention

The present invention relates to generation of a test driver, and more particularly, to an apparatus and method for generating a test driver used to test units for architecture design and verification.

2. Discussion of Related Art

Generally, in designing a software system, an architecture model in the form of a block diagram or a component diagram is produced, and the software system is divided into components according to the architecture model. The entire software system operates through interaction between the components.

The architecture model uses various architectural styles for a project. In every architectural style, connections between components that may be software modules are generally represented by interfaces that can give and receive messages.

Typical unit testing methods employ a waterfall technique and an evolutionary technique.

In the waterfall technique, testing is done through a typical development process. This method includes making and analyzing a request, designing a system, coding, final testing, and distributing. However, in this waterfall technique, it is difficult to identify potential problems early on because final testing is only performed once a system is complete.

To address this drawback, the evolutionary technique was introduced. The evolutionary technique implements, tests and modifies a system on a module by module basis. This technique has the advantage of preventing errors in advance by initially designing a test computer aided software engineering (CASE). That is, since this technique performs testing with a utility such as a unit test framework, a developer can check whether a system is being correctly developed as the development proceeds.

Apparatuses and methods for generating a test driver for an architecture test and verification through unit testing based on such an evolutionary technique have been proposed.

For example, U.S. Pat. No. 5,799,266, entitled "Automatic Generation of Test Drivers," is directed to reducing the burden of test case programming by generating a test driver code based on a test specification.

In this disclosure, a test driver generator receives a test equation with an attribute value corresponding to a sequence of executing test functions for a software interface and attribute values of test parameters, and generates a test driver that can perform all combinations of selected parameter attribute values of the test functions according to an order of the specified test functions.

U.S. Pat. No. 6,353,897, entitled "Object Oriented Apparatus and Method for Testing Object Oriented Software," is directed to a framework for testing in an object oriented programming environment.

In this disclosure, an abstract test driver class and a test case class are defined. Each test driver is made as an extension of the test driver class and each test case is made as an extension of the test case class. When an instance of the test driver class is executed, a test case to be executed is determined in advance and an execution result is reported.

Further, U.S. Pat. No. 6,243,835, entitled "Test Specification Generation System and Storage Medium Storing a Test Specification Generation Program," is directed to generation of a test specification with a repository of design information entered during a design process to increase operation efficiency of a testing process.

In this disclosure, a data analysis device reads statements written to a test set file on a line by line basis, and then a test item determination device determines a feature of a test item. Specifically, a first test item generation device generates a test item based on information obtained from a design information table with a design information reading device, and a second test item generation device generates a test item from a standard test item file. A test specification writing device outputs fixed output lines and test items generated by the first and second test item generation devices to generate a test specification file.

However, since the apparatus and method for generating a test driver based on the evolutionary technique generates the test driver by means of a given test specification, there is an initial difficulty in designing the test case. Thus, under-skilled developers may experience great difficulty in unit test production.

In addition, since an object oriented inheritance characteristic is used to test a unit, it is up to developers to directly develop software to be tested and provide an environment that can execute codes of a number of test cases. This can be a considerably tedious task.

SUMMARY OF THE INVENTION

The present invention is directed to implementation of a system in which design requirements are generated in the form of a test driver and provided to a developer, such that components used to design a software system satisfy the design requirements.

The present invention is also directed to implementation of an apparatus and method for generating a test driver, capable of reducing errors early on by immediately checking whether architecture design requirements are satisfied when developing components.

The present invention is also directed to implementation of an apparatus and method for generating a test driver, capable of easily performing a pre-test in software development by generating a test case that can be used to test individual components in a design stage to perform unit testing, and supporting the test case to allow a component developer to develop a system while performing testing.

In an exemplary embodiment of the present invention, an apparatus for generating a test driver comprises: a test driver generator for generating a component framework code based on component model information and snapshot information of an interface for the component described in an architecture model, and generating a test driver code for checking after setting a test environment and performing a test, based on the framework code; a tester for performing the test using the component framework code and the test driver code generated by the test driver generator; and a test result comparator for comparing test results from the tester to detect errors.

Preferably, the test driver generator comprises an architecture model producer for inputting an architecture model through a software system as a graphic user interface, the architecture model including at least one component; a snapshot information analyzer for receiving information about an interface for each component from the architecture model producer to analyze snapshot information for the interface for the component and extract a state variable of the component; a component framework code generator for generating a component framework code based on the snapshot information analyzed by the snapshot information analyzer, the component framework code including the state variable defined in the component; and a test driver code generator for generating a test driver code by repeatedly performing a test to determine whether the state value of the component reaches a preset expected value using the interface for each component giving access to the state variable of the component analyzed by the snapshot information analyzer.

Preferably, the test driver code generator comprises: a test preparation code generator for generating a test preparation code, the test preparation code being a source code sentence for setting a state of a state variable defined in the snapshot using an interface giving access to the state variable added to the component framework code; and a test check code generator for generating a test check code as a source code for unit testing by repeatedly performing a comparison-based test to determine whether the state value after interfacing with a component to be tested reaches a preset expected value, based on the test preparation code generated by the test check code generator.

Preferably, the architecture model comprises definitions of components, and information about interfaces for the components.

Preferably, the snapshot information comprises at least one of a state variable list storing state variables associated with the snapshot, a state value list storing state values corresponding to the state variables, an input value list storing input values given to parameters of the interfaces, and an expected value list storing expected values for the input values.

Preferably, the framework code of the component comprises at least one of a component definition portion, a state variable definition portion, a normal interface definition portion, and a state variable interface definition portion.

In another exemplary embodiment of the present invention, a method for generating a test driver comprises the steps of: inputting specific snapshot information to an interface for an individual component of an architecture model to extract a state variable storing state information of the component; generating a framework code of each component using the interface for the component that sets and checks the extracted state variable; and automatically generating a test driver code by repeatedly performing a comparison-based test to determine whether the state value of the component reaches a preset expected value through the interface for the component giving access to the set state variable.

In yet another exemplary embodiment of the present invention, a method for generating a test driver comprises the steps of: inputting an architecture model as a design model for testing, the architecture model including a plurality of components; inputting specific snapshot information of each interface for the components to extract a state variable storing state information of the component; generating a framework code of each component to enable unit testing for the component to proceed smoothly, based on information input through the input architecture model; generating a test preparation code setting a test environment through the interface for the component giving access to the extracted state variable; generating a test check code as a source code for unit testing by repeatedly performing a comparison-based test to determine whether the state value after interfacing with a component to be tested reaches a preset expected value, based on the generated test preparation code, thereby automatically generating a test driver code; and performing testing based on the generated component framework code and the generated test driver code and detecting errors caused in component development early on by comparing the test results.

Preferably, the architecture stores definitions of components and information between component interfaces.

Preferably, the component has a state variable defined to indicate its state, and information about the state variable is in the form of attribute information of the component.

In yet another exemplary embodiment of the present invention, a method for generating a test driver comprises the steps of: inputting specific snapshot information to an interface for an individual component of an architecture model to extract a state variable storing state information of the component; generating a framework code of each component using the interface for the component that sets and checks the extracted state variable; and automatically generating a test driver code by repeatedly performing a comparison-based test to determine whether the state value reaches a preset expected value through the interface for the component giving access to the set state variable.

In yet another exemplary embodiment of the present invention, a method for generating a test driver comprises the steps of: inputting an architecture model as a design model for testing, the architecture model including a plurality of components; inputting specific snapshot information of each interface for the components to extract a state variable storing state information of the component; generating a model code of each component to enable unit testing for the component to proceed smoothly, based on information input through the input architecture model; generating a test preparation code setting a test environment through the interface for the component giving access to the extracted state variable; generating a test check code as a source code for unit testing by repeatedly performing a comparison-based test to determine whether the state value after interfacing with a component to be tested reaches a preset expected value, based on the generated test preparation code, thereby automatically generating a test driver code; and performing testing based on the generated component model code and the generated test driver code and early detecting errors caused in component development through a comparison of test results.

Preferably, the architecture stores definitions of components and information between component interfaces.

Preferably, the component has a state variable defined to indicate its state, and information about the state variable is in the form of attribute information of the component.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

An apparatus and method for generating a test driver according to an exemplary embodiment of the present invention will be described with reference to the accompanying drawings.

Figure 1:
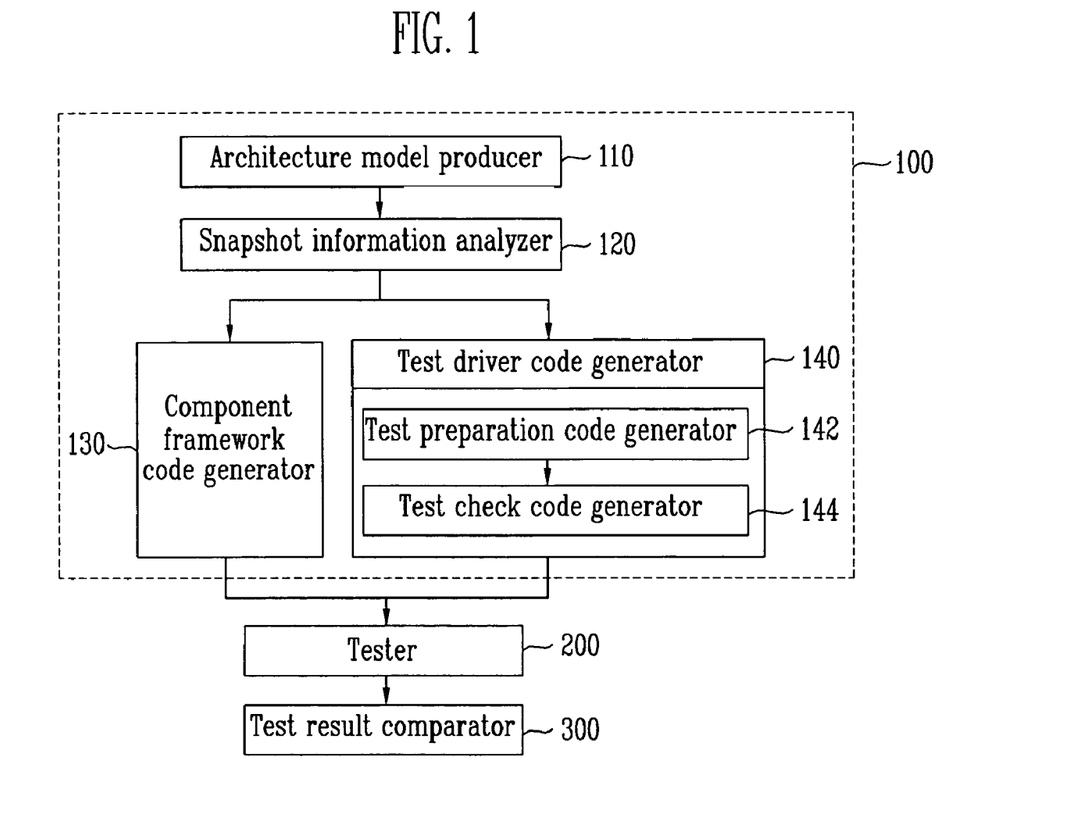
FIG. 1 illustrates the configuration of an apparatus for generating a test driver according to an exemplary embodiment of the present invention.

FIG. 1 illustrates the configuration of an apparatus for generating a test driver according to an exemplary embodiment of the present invention Referring to FIG. 1, the apparatus includes a test driver generator 100 for generating a component framework code and a test driver code based on component model information described in an architecture model and snapshot information of an interface for the component, a tester 200 for performing a test using the component model code and the test driver code generated by the test driver generator 100, and a test result comparator 300 for comparing test results from the tester 200 to detect errors.

The test driver generator 100 includes an architecture model producer 110, a snapshot information analyzer 120, a component framework code generator 130, and a test driver code generator 140.

The architecture model producer 110 inputs an architecture model composed of at least one component through a software system that is a graphics user interface. Preferably, the architecture model input by the architecture model producer 110 includes definitions of components and information about interfaces for the components.

The snapshot information analyzer 120 receives the interface information of each component from the architecture model producer 110, analyzes snapshot information of the interface for the component, and extracts a state variable storing state information of the individual component.

The component framework code generator 130 generates a component framework code including the state variable defined in the component, based on the snapshot information analyzed by the snapshot information analyzer 120. Preferably, the framework code of the component includes at least one of a component definition portion, a state variable definition portion, a normal interface definition portion, and a state variable interface definition portion.

Finally, using the interface for each component giving access to the state variable of the component analyzed by the snapshot information analyzer 120, the test driver code generator 140 generates a test preparation code setting a test environment, and generates a test check code by repeatedly performing a comparison-based test to determine whether the state value after interfacing with each component reaches a preset expected value, thereby automatically generating a test driver code.

The test driver code generator 140 includes a test preparation code generator 142 and a test check code generator 144.

The test preparation code generator 142 generates a test preparation code as a source code sentence that sets a state of the state variable defined in the snapshot using the interface giving access to the state variable added to the component framework code.

The test check code generator 144 generates a test check code as a source code for unit testing by repeatedly performing a test to determine whether the state value after interfacing with the component to be tested reaches a preset expected value, based on the test preparation code generated by the test preparation code generator 142.

Preferably, the snapshot information includes at least one of a state variable list storing state variables associated with the snapshot, a state value list storing state values corresponding to the state variables, an input value list storing input values given to parameters of interfaces, and an expected value list storing expected values for the input values.

A method for generating a test driver according to an exemplary embodiment of the present invention will be described in greater detail with reference to the accompanying drawings.

Figure 3:
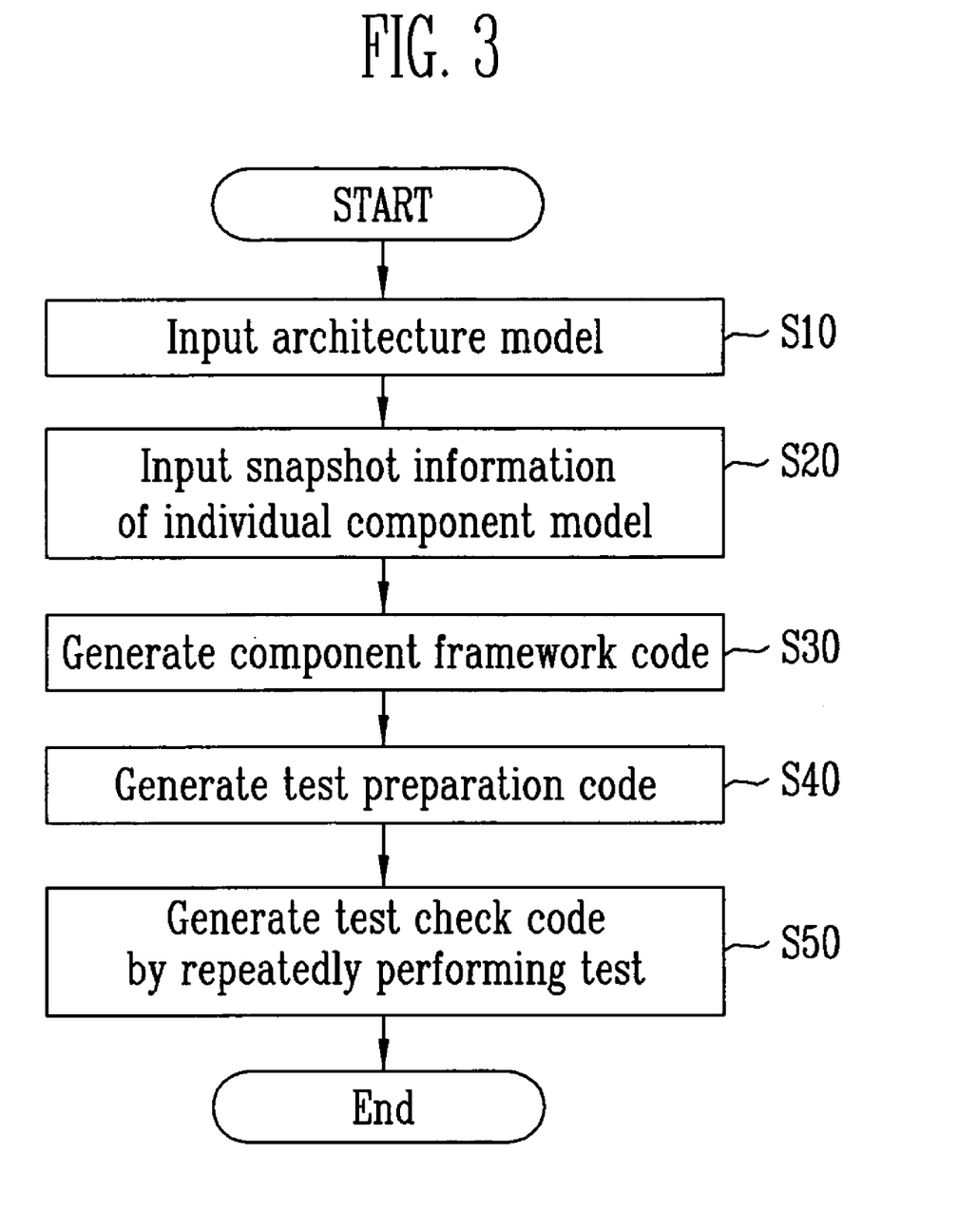
FIG. 3 is a flowchart illustrating a method for generating a test driver according to an exemplary embodiment of the present invention.

FIG. 3 is a flowchart illustrating a method for generating a test driver according to an exemplary embodiment of the present invention.

Referring to FIG. 3, a user of the present system first inputs an architecture model composed of a plurality of components through the architecture model producer 110 (S10).

Figure 2:
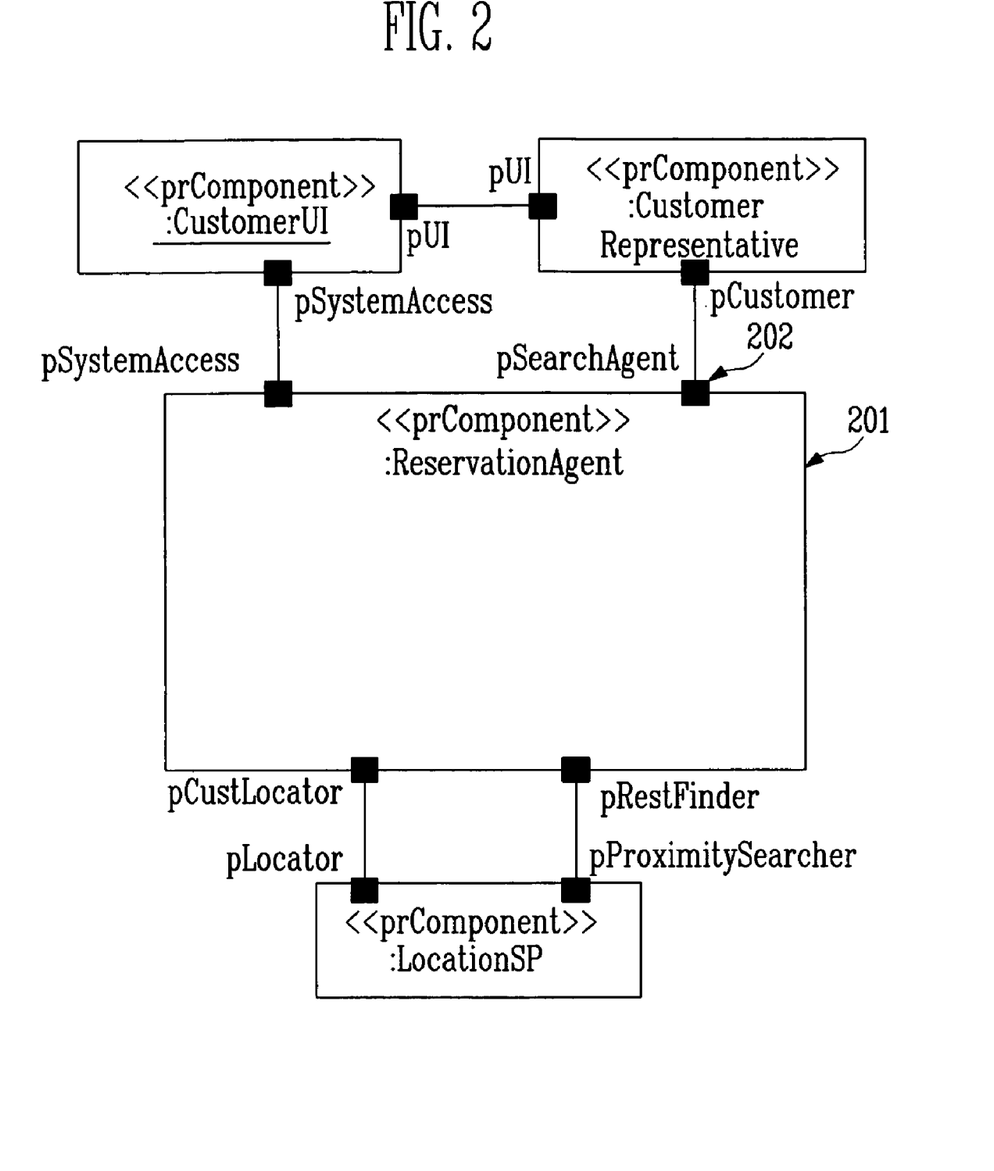
FIG. 2 illustrates the configuration of an architecture model in an apparatus for generating a test driver according to an exemplary embodiment of the present invention.

The architecture has a plurality of components connected to each other, as shown in FIG. 2. The architecture stores definitions of the components and information about the interfaces for the components. The components have a state variable defined to indicate their state, in which information about the state variable is in the form of an attribute of the component.

The user then inputs specific snapshot information of the interface for each component of the architecture through the snapshot information analyzer 120 to extract a state variable storing the state information of individual components (S20).

Figure 4:
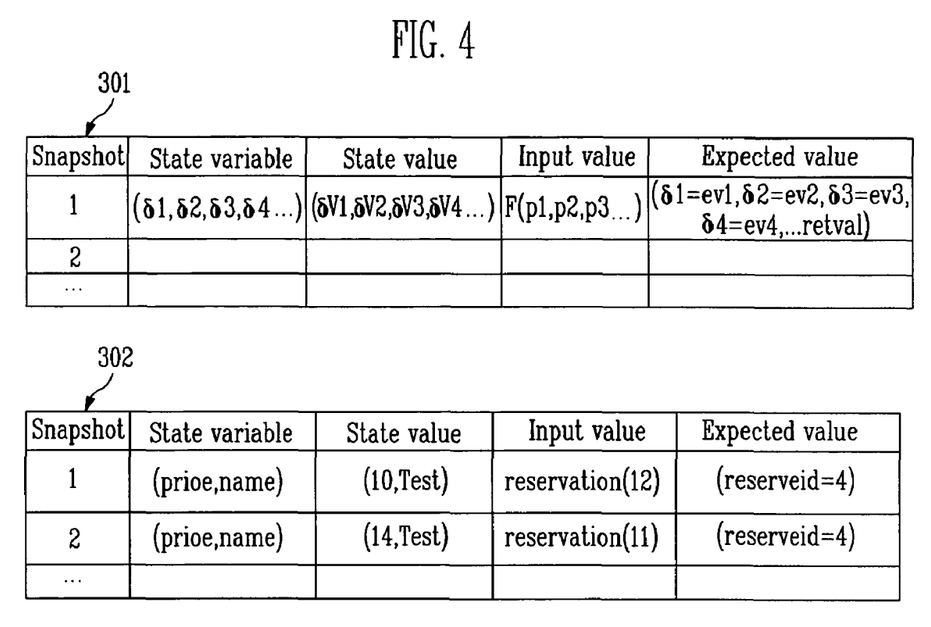
FIG. 4 illustrates the configuration of snapshot information in an apparatus for generating a test driver according to an exemplary embodiment of the present invention.

The snapshot information includes a state variable list, a state value list, an input value list, and an expected value list, as shown in FIG. 4. The state variable list includes state variables associated with the snapshot. The input value list includes input values given to parameters of the component interface. The input values may be automatically generated by an automatic generation scheme. The expected value list includes expected values for the input values. In this case, each expected value includes a returned expected value, including an expected value of the state variable.

Here, a designer inputs a desired number of snapshot information through the snapshot information analyzer 120.

Using the information input through the architecture model by the architecture model producer 110, a framework code of each component is generated to enable unit testing for the component to proceed smoothly (S30).

Figure 6:
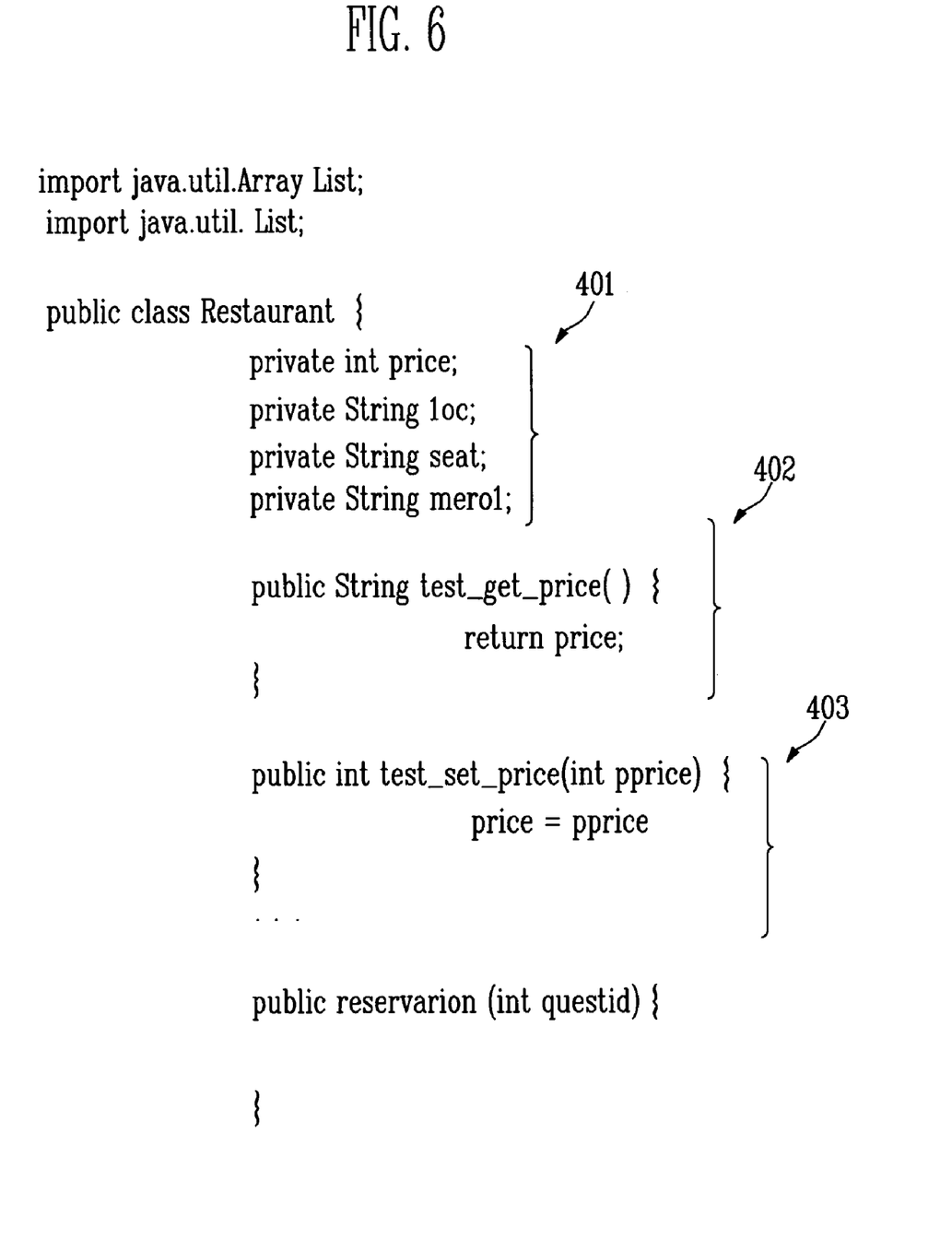
FIG. 6 illustrates a component framework code in the form of a clad of the Java language in a method for generating a test driver according to an exemplary embodiment of the present invention.

In this case, specific snapshot information is first input to the interface for the individual component of the architecture model so that the state variable storing the state information of the component is extracted (401). An interface that sets and checks the extracted state variable is then added to enable unit testing for the component to proceed smoothly (402 and 403).

Figure 5:
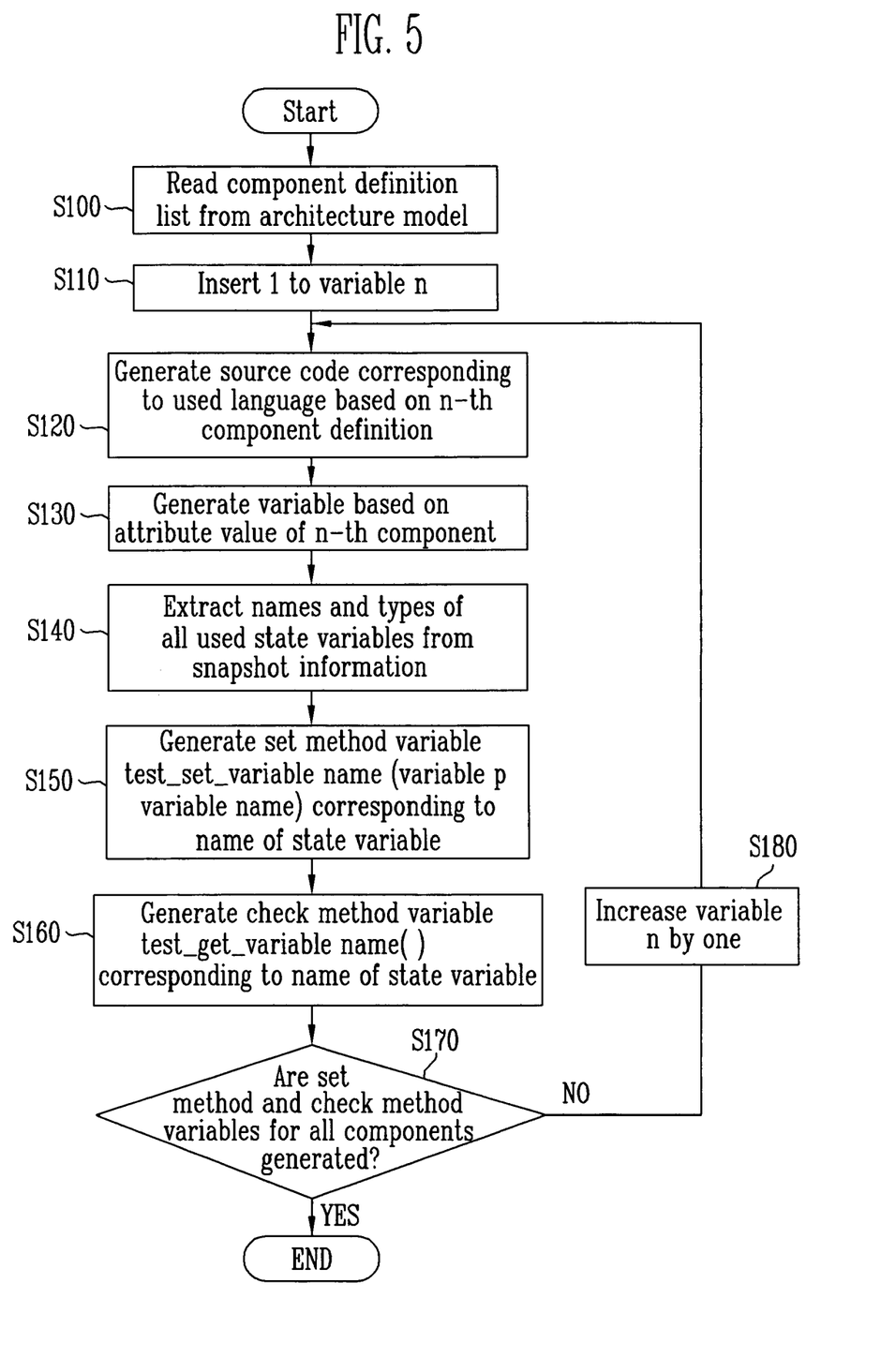
FIG. 5 is a flowchart illustrating a process of generating a component framework code in a method for generating a test driver according to an exemplary embodiment of the present invention.

FIG. 5 is a flowchart illustrating a process of generating a component framework code in the method for generating a test driver according to an exemplary embodiment of the present invention.

Referring to FIG. 5, a component definition list is read from the extracted architecture model (S100).

A source code corresponding to a used language is generated based on the n-th component definition (S120), and a variable is generated based on an attribute value of the component (S130).

Names and types of all used state variables are extracted from the snapshot information of the extracted architecture model (S140).

A set method (test_set_variable name) corresponding to the thus extracted name of the state variable is generated (S150), and a check method variable (test_get_variable name) corresponding to the name of the state variable is generated (S160).

A determination is then made as to whether set methods and check method variables for all (n) components are generated (S170). When the entire process is completed (S180 and S110), the process of generating the component framework code is terminated.

The thus generated framework code of each component includes a component definition portion, a state variable definition portion, a normal interface definition portion, and a state variable interface definition portion. The state variable interface definition portion is used to set a state variable for a test process and check a value of the state variable. In this case, the state variable interface portion may be eliminated for security once the software system is finally completed.

FIG. 6 illustrates a component framework code in the form of a clad of the Java language in the method for generating a test driver according to an exemplary embodiment of the present invention.

The test preparation code generator 142 generates a test preparation code for setting a test environment with the component interface giving access to the state variable, based on the snapshot information analyzed by the snapshot information analyzer 120 (S40).

To perform testing for each interface for the component, a code is produced which calls for a method of setting a state variable and a state value for each snapshot.

The test check code generator 144 generates a test check code as a source code for unit testing by repeatedly performing a test to determine whether the state value after interfacing with a component to be tested reaches a preset expected value, based on the test preparation code generated by the test preparation code generator 142, thereby automatically generating a test driver code (S50). That is, when execution of the method is completed, the test check code generator checks whether each state variable value is exactly reflected after the interface is called for.

Figure 7:
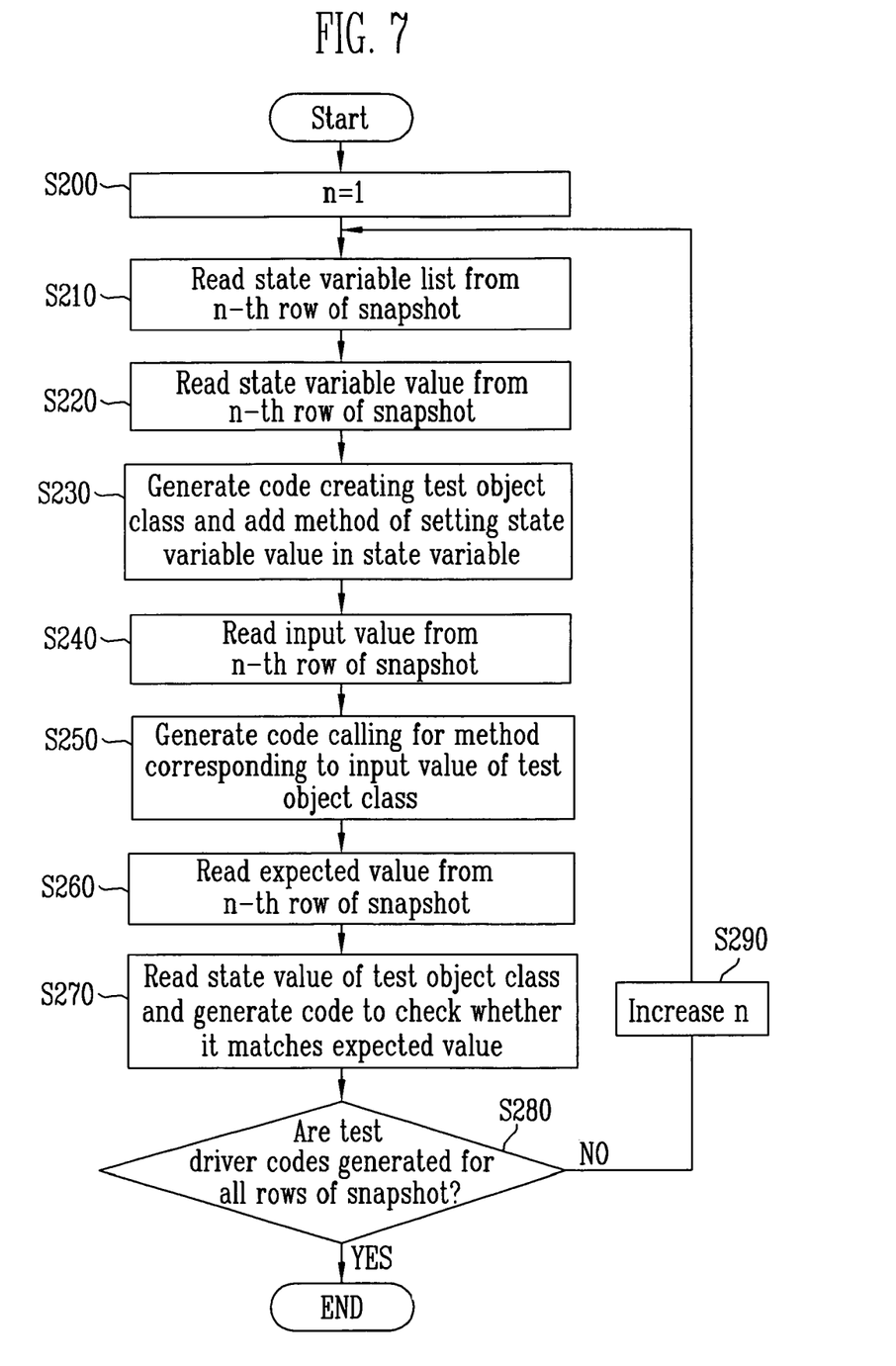
FIG. 7 is a flowchart illustrating a process of generating a test driver code in a method for generating a test driver according to an exemplary embodiment of the present invention.

FIG. 7 is a flowchart illustrating a process of generating a test driver code in the method for generating a test driver according to an exemplary embodiment of the present invention.

Referring to FIG. 7, a state variable list is first read from the n-th row of a snapshot (S200 and S210) and a state variable value is read from the n-th row of the snapshot (S220).

A code creating a test object class is then generated, and a method of setting a state variable value in the state variable is added (S230).

An input value is read from the n-th row of the snapshot (S240), and a test preparation code calling for a method corresponding to the read input value of the test object class is generated (S250).

An expected value is then read from the n-th row of the snapshot (S260).

A state value of the test object class is read and a test check code is generated to check whether the test check code matches the expected value (S270).

A determination is then made as to whether test driver codes are generated for all rows of the snapshot (S280). When the entire process is completed (S290 and S200), the process of generating the test driver code is terminated.

Figure 8:
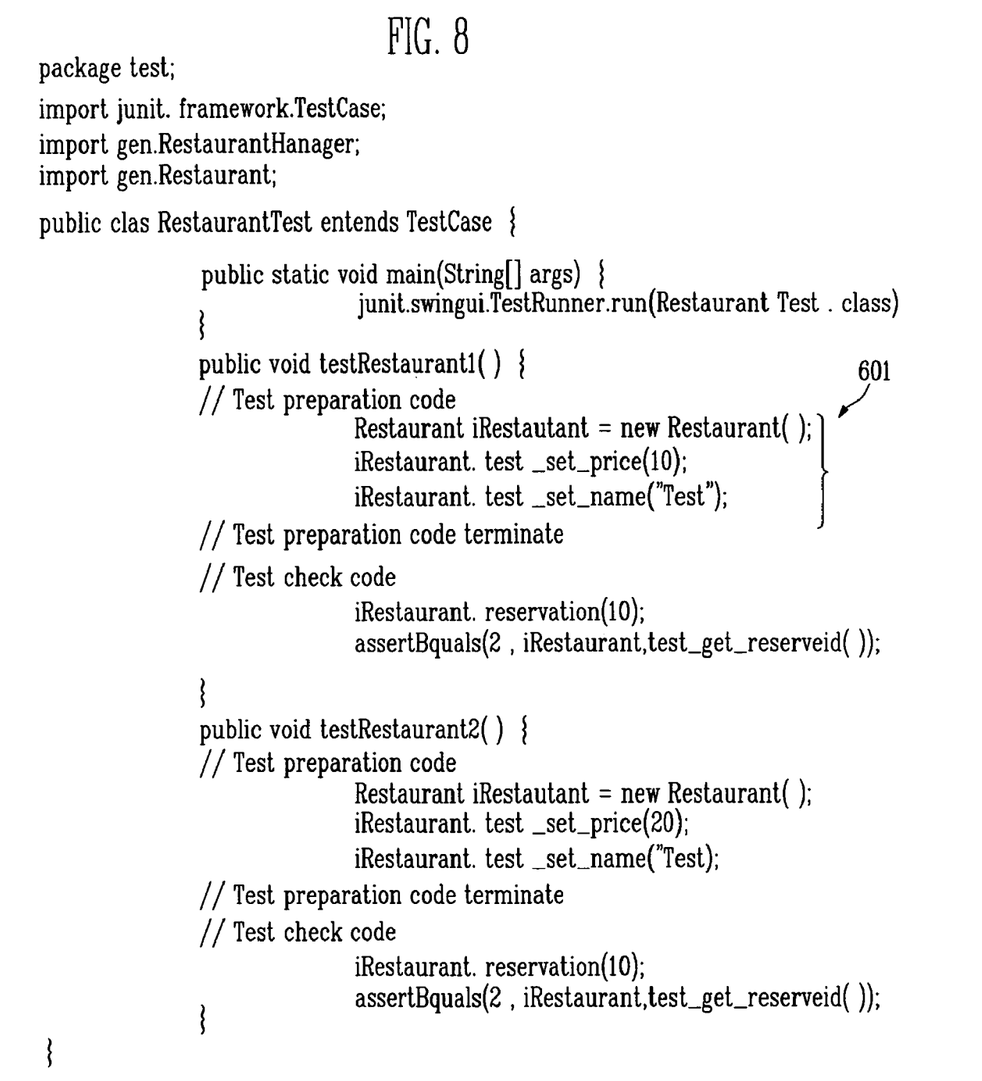
FIG. 8 illustrates a test driver code in the form of a clad of the Java language in a method for generating a test driver according to an exemplary embodiment of the present invention.

FIG. 8 illustrates a test driver code formed in the form of a clad of the Java language in the method for generating a test driver according to an exemplary embodiment of the present invention.

The tester 200 performs a test using the component model code generated by the component framework code generator 130 and the test driver code generated by the test driver code generator 140. The test result comparator 300 compares the test results obtained by the tester 200 to detect errors caused in the development of components early on.

The apparatus and method for generating the test driver according to the present invention as described above have the following advantages:

First, it is possible to reduce errors caused in component development at an early stage by generating a test driver code according to a rule of a typical unit test framework, to perform the unit test framework so that checking is immediately done as to whether architecture design requirements are satisfied in component development.

Second, it is possible to perform checking through unit testing so that the software system is developed as desired by an architecture designer.

Third, it is possible to easily perform a pre-test during software development by generating a test case that can be used to test individual components in a design stage to perform a typical unit test, and supporting the test case so that a component developer can test components while they are being developed.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A computer apparatus having a microprocessor controlling a graphic user interface and the microprocessor driven by a software system for generating a test driver code for an architecture model of developing software, the apparatus comprising:

an architecture model producer for inputting the architecture model through the graphic user interface, the architecture model including at least one component, each component having a definition and interface information;

a snapshot information analyzer for receiving state values of the interface information of each component in the inputted architecture model to establish a snapshot and to analyze for snapshot information corresponding to each component of the inputted architecture model at the snapshot;

a component framework code generator for generating a framework code, the framework code based on the snapshot information and on the interface information of each component; and a test driver code generator, using the snapshot information and the framework code, for generating a test preparation code that sets a test environment for the architecture model corresponding to the snapshot;

a tester, using the framework code, for performing a comparison-based test of the test preparation code against expected values of the state values of the interface information of each component; and a test result comparator for comparing test results from the tester to generate the test driver code wherein the snapshot information includes a list of state variables of each component, a list of input parameters of a state interface of each component, and a list of expected values, wherein the test driver code is generated only if after interfacing the tester determines that the state values of the interface information of each component of the architecture model reach the expected values.

2. The apparatus of claim 1, wherein the test preparation code is a source code.

3. The apparatus of claim 1, wherein the test check code is a source code.

4. The apparatus of claim 1, wherein the interface information of each component of the architecture model includes a state variable information, a normal interface definition, and a state variable interface definition.

5. The apparatus of claim 1, wherein the framework code includes a component definition portion, a state variable definition portion, a normal interface definition portion, and a state variable interface definition.

6. A computer apparatus having a microprocessor controlling a graphic user interface and the microprocessor driven by a software system for generating a test driver code for an architecture model of developing software, the apparatus comprising:

an architecture model producer for inputting the architecture model through the graphic user interface, the architecture model including at least one component, each component having a definition and interface information, wherein the interface information of each component of the architecture model includes a state variable information, a normal interface definition, and a state variable interface definition;

a snapshot information analyzer for receiving state values of the interface information of each component in the inputted architecture model to establish a snapshot and to analyze for snapshot information corresponding to each component of the inputted architecture model at the snapshot, wherein the snapshot information includes a list of state variables of each component, a list of input parameters of a state interface of each component, and a list of expected values;

a component framework code generator for generating a framework code, the framework code based on the snapshot information and on the interface information of each component, wherein the framework code includes a component definition portion, a state variable definition portion, a normal interface definition portion, and a state variable interface definition; and a test driver code generator, using the snapshot information and the framework code, for generating a test preparation code after setting a test environment for the architecture model corresponding to the snapshot and the test driver code generator also for generating a test check code that repeatedly performs a comparison-based test of the test environment of the test preparation code against expected values of the state values of interface information of each component to generate the test driver code, wherein the snapshot information includes a list of state variables of each component, a list of input parameters of a state interface of each component, and a list of expected values, wherein the test driver code is generated only if after interfacing the tester determines that the state values of the interface information of each component of the architecture model reach the expected values.

7. The apparatus according to claim 1, wherein the test preparation code is a source code.

8. The apparatus according to claim 1, wherein the test check code is a source code.

9. A non-transient computer readable medium having a computer program stored therein, the computer program configured to control a processor to perform a method for generating a test driver code for an architecture model of developing software, the method comprising the steps of:

inputting an architecture model through a graphic user interface, the architecture model including at least one component wherein each component has a definition and interface information;

receiving state values of the interface information of each component in the inputted architecture model to establish a snapshot and to analyze for snapshot information corresponding to each component of the inputted architecture model at the snapshot;

generating a framework code based on the snapshot information and on the interface information of each component; and generating a test preparation code using the snapshot information and the framework code, after setting a test environment for the architecture model corresponding to the snapshot; and generating a test check code that repeatedly performs a comparison-based test of the test environment of the test preparation code against expected values of the state interface of each component to generate the test driver code;

performing using the framework code, a comparison-based test of the test preparation code against expected values of the state values of the interface information; and comparing test results from the tester to generate the test driver code wherein the snapshot information includes a list of state variables of each component, a list of input parameters of a state interface of each component, and a list of expected values, wherein the test driver code is generated only if after interfacing the tester determines that the state values of the interface information of each component of the architecture model reach the expected values.

10. The non-transient computer readable medium of claim 9, wherein the interface information of each component of the architecture model includes a state variable information, a normal interface definition, and a state variable interface definition.

11. The non-transient computer readable medium of claim 9, wherein the framework code includes a component definition portion, a state variable definition portion, a normal interface definition portion, and a state variable interface definition.

* * * * *